May 2, 1961 V. P. JOHNSON 2,982,623
REFRACTORY LINING FOR VESSELS
Original Filed May 24, 1949 3 Sheets-Sheet 2
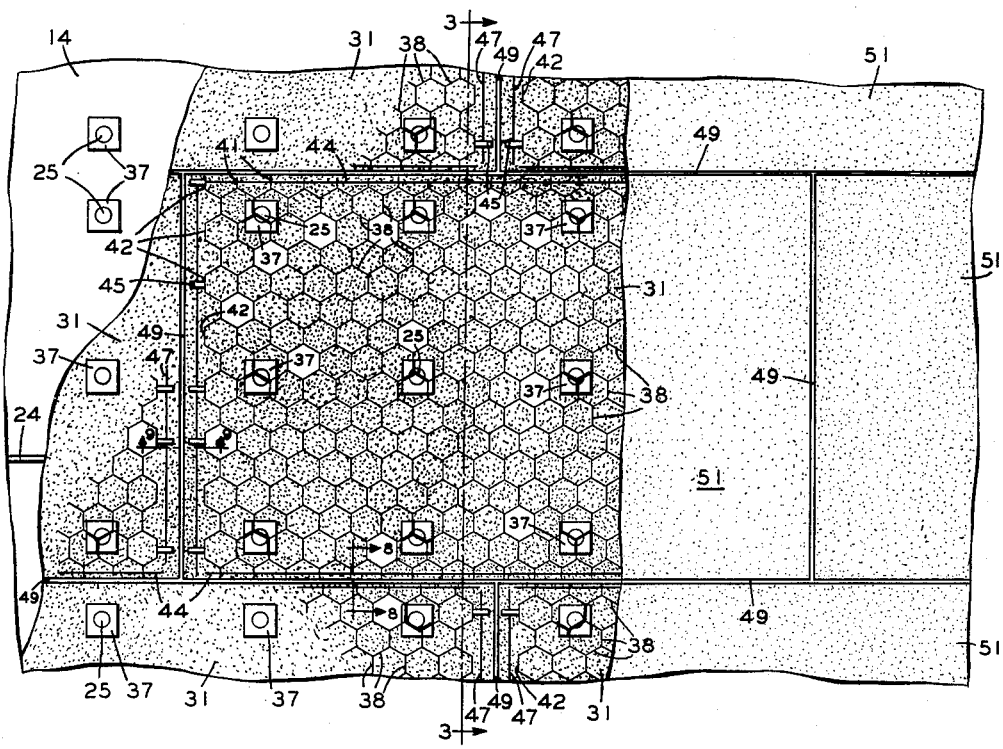
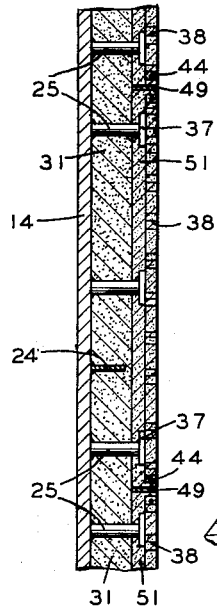
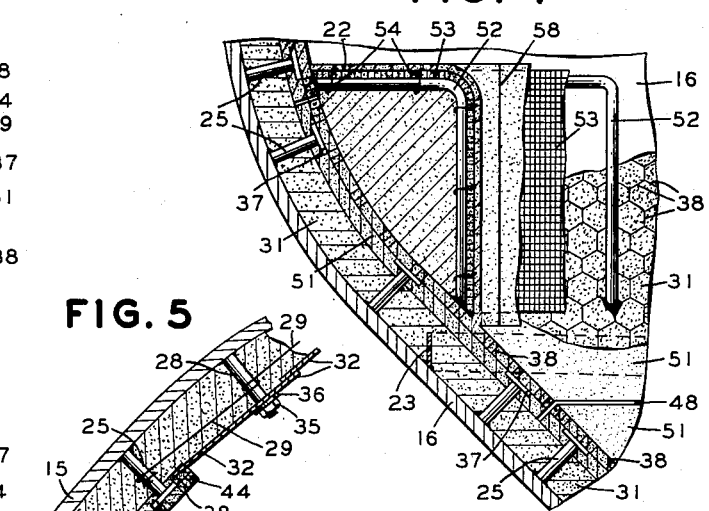
INVENTOR
VICTOR P. JOHNSON
BY B. H. Palmer
J. T. Davies
ATTORNEYS May 2, 1961  V. P. JOHNSON  2,982,623
REFRACTORY LINING FOR VESSELS
Original Filed May 24, 1949  3 Sheets-Sheet 3
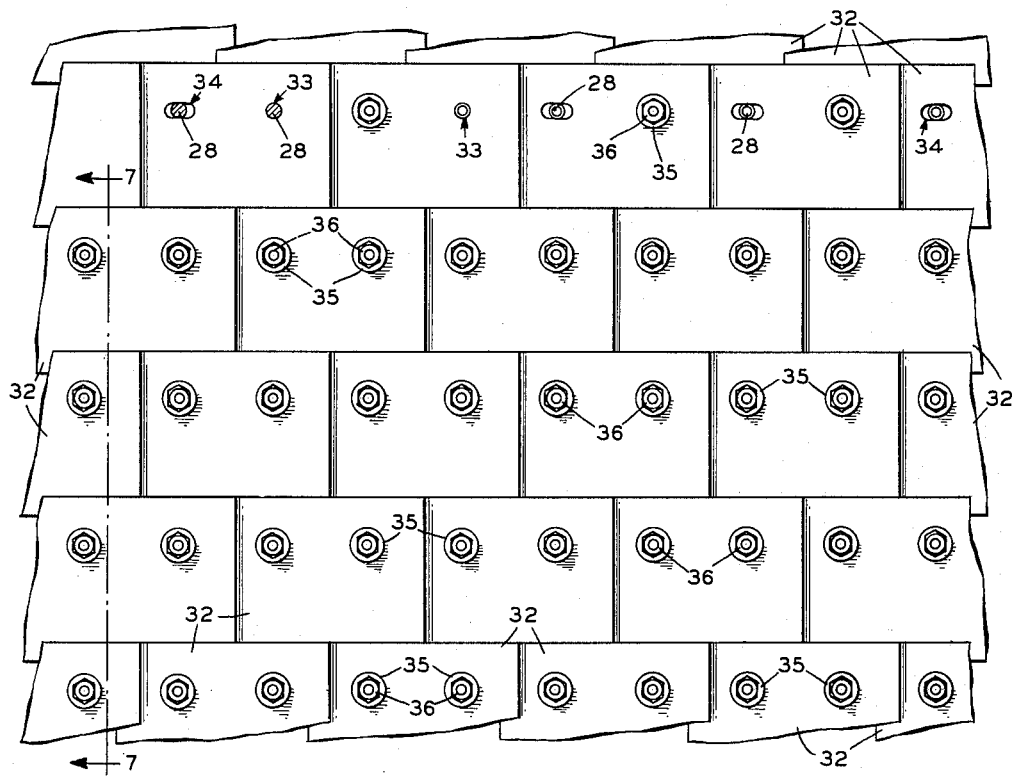
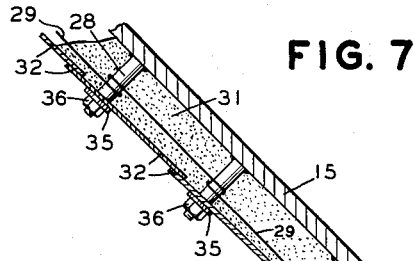
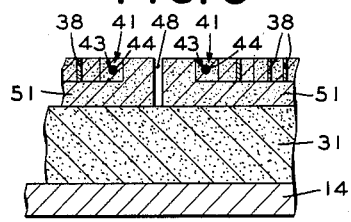
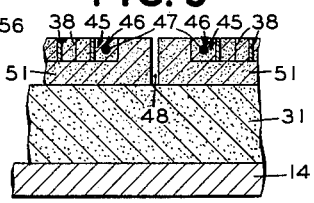
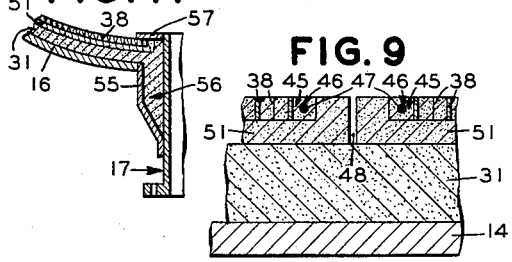
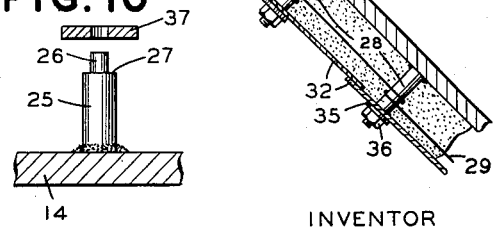
INVENTOR
VICTOR P. JOHNSON
BY S. H. Palmer
V. Y. Davies
ATTORNEYS

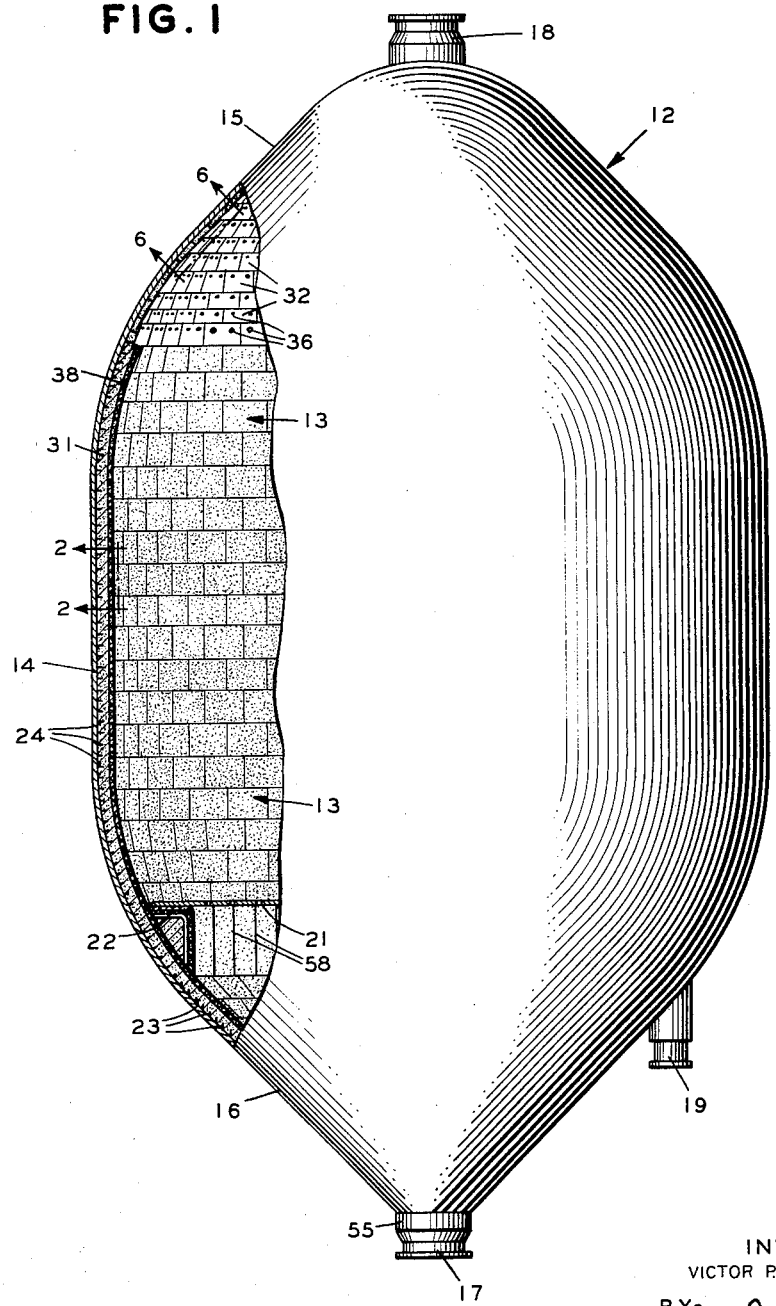

2,982,623
Patented May 2, 1961

2,982,623
REFRACTORY LINING FOR VESSELS

Victor P. Johnson, Jersey City, N.J., assignor to The M. W. Kellogg Company, Jersey City, N.J., a corporation of Delaware Original application May 24, 1949, Ser. No. 92,127. Divided and this application June 25, 1956, Ser. No. 593,424

2 Claims. (Cl. 23—288)

This invention relates to improvements in thermal insulating and protective linings for vessels of the type generally employed in processes involving the handling of masses of finely divided solid material in contacting or reaction zones at relatively high temperatures. The lining disclosed in the present invention is peculiarly suited for use in the large reaction and regeneration chambers in plants devoted to the catalytic cracking of petroleum. These chambers create special problems because the hydrocarbon vapors to be created are passed upwardly through a mass of finely powdered catalyst at temperatures of about 1100° F. and at velocities such that the catalyst is maintained in a fluidized or pseudo-liquid condition having a lower dense phase separated from an upper dilute phase by an interface and having catalyst within said fluidized dense phase in an extremely turbulent condition; the turbulent dense phase has a severely abrasive action and tends to destroy ordinary fire brick and metal linings. The lining in the present invention is comprised of a monolithic insulating layer of cement deposited on the inner surface of a steel shell to a depth sufficient to effect the required temperature control, and a second layer of extremely dense and abrasive resistant cement deposited on said second layer to protect it from abrasion; preferably, the monolithic laminated lining so constructed is supported and re-enforced by means of thousands of steel studs welded to the shell surface, and a steel mesh welded to the ends of said studs and embedded in said abrasion resistant layer.

This application is a division of application Serial No. 95,127, filed May 24, 1949, and now abandoned, which in turn is a continuation-in-part of application Serial No. 754,164, filed June 12, 1947, and now abandoned.

In the catalytic cracking of heavy petroleum crude fractions to obtain light weight hydrocarbons more suitable for motor fuel, the hydrocarbons and powdered catalyst are contacted in a reactor comprised of a steel shell about 20 feet in diameter and 30 feet high, which shell is lined with a few inches of refractory material in order to limit the shell temperatures to about 300° F., since higher temperatures would weaken the shell structure. The catalyst must be continuously regenerated in a regenerator vessel which is similarly constructed except that it is somewhat larger, and somewhat thicker insulation is required because the temperatures exceed those of the reactor by about 150° F. (about 1050° F. for the regenerator and about 900° F. for the reactor). Prior to the present invention, it was the custom to line these vessels with fire brick. The brick very adequately protected the shell from the high temperature catalyst and gases, but the constant abrasive action of the turbulent catalyst particles suspended in the gases passing through the vessel consumed the brick so rapidly that it was commonly necessary to shut down the plant every three or four months so that the brick could be repaired. Exposed steel nuts and angle iron supports were eaten away, at least in part, within a few months. The cement between bricks was scoured away and partially destroyed bricks fell from the lining.

The present invention provides a lining which is cheaper to install than the previously known linings for such vessels and which has been in operation for as long as three years without exhibiting any signs of wear whatever. One of the advantageous features of the present invention is that it is monolithic. Although the exposed surface may be constructed with heat expansion slots, these slots are merely indentations in the surface of a lining deposited as a single concrete monolith. The lining although monolithic, is deposited in at least two laminated layers. An under layer is deposited upon the steel shell surface to a sufficient thickness to limit the steel shell temperatures to about 250° F. to 300° F. The primary function of the under layer of concrete is heat insulation. To this end, a concrete which is of low density (in the range of 50 to 75 pounds per cubic foot, most commonly about 65 pounds per cubic foot) is employed. However, the very qualities of said low density concrete, for example its porosity and coarse grain, which make it a good insulator, also make it structurally weak so that it is readily destroyed by the violent action of fluidized solids under reaction conditions. Moreover, the materials which impart the best insulating qualities to refractory cement have poor resistance to abrasion. For this reason, an outer layer of concrete of very different type is deposited on the insulating layer to protect it from the severe abrasion action of fluidized materials within the vessel. The outer layer is comprised of dense, fine grained, hard, abrasion resistant concrete, its density being in the range of 100 to 140 pounds per cubic foot, but most commonly 120 pounds per cubic foot.

Both of the two different types of concrete employed may be fabricated by any suitable method known in the art of mixing and applying refractory concrete. The desired properties for each layer are obtained, as is well known in the art, by employing an aggregate having the specified properties. Each concrete is comprised of a minor proportion of a hydraulic setting, binding material (typically an aluminum silicate cement with an admix to increase workability and bonding) and a major proportion of "aggregate"—the mineral or rock material which the binder holds together. In the case of the insulating layer, a low density, porous, refractory material, usually a relatively coarse material, is employed as aggregate. In the abrasion resistant outer layer, a relatively fine grained, high density, hard, durable, refractory material is used as aggregate. How refractory the aggregate must be, will depend upon the temperatures to which the vessel is to be exposed. Although the aggregate will be the predominant proportion in every case, exact proportions may be varied to suit the engineering requirements in a particular case, all in a manner well known in the art of refractory concrete construction.

While it is conceivable that the invention may be employed by depositing the concrete layers in various ways, in its preferred form, the invention involves depositing the concrete by spraying a wet concrete mix under pneumatic pressure in a manner well known in the art as the Gunite method.

In accordance with the present invention it is proposed to perform the major portion of the fabrication of the various elements making up the lining at the site of installation, so that it is possible to ship to the point of installation the raw materials and partially formed elements which make up the lining structure. By fabricating directly from the raw materials and partially formed elements it is possible to avoid the expense of special handling which is normally required when refractory elements are preformed and shipped to the point of installation. Additional savings may also be effected by reason of the absence of losses due to breakage of the elements in shipment.

Another object of the invention is to provide a thermal insulating and protective lining for vessels adapted for substantially complete fabrication at the place of application, which will have a high degree of flexibility in order to withstand distortions of the vessel by reason of rapid and marked temperature changes occurring within the vessel, and which may readily be partially replaced or repaired. By reason of the fact that the lining of the present invention is fabricated almost entirely from the raw or partially prepared materials, shutdown periods for the purpose of effecting such repairs as are necessary may be substantially shortened.

These other objects are effected by the invention as will be apparent from the following description and claims taken in connection with the accompanying drawings forming a part of this application in which:

Fig. 1 is a view in elevation of a regenerator vessel to which the improved lining has been applied, portion being cut to reveal the inner wall structure;

Fig. 2 is an enlarged view of a portion of the lining, showing one full insulation panel and fragmentary portions of the adjacent connected panels applied to the mid-section of the vessel;

Fig. 3 is a section view taken along the line 3—3 of Fig. 2;

Fig. 4 is an enlarged sectional view of a fragmentary portion of the vessel showing the construction of the ledge to prevent the by-passing of catalyst around edge of grid;

Fig. 5 is an enlarged sectional view of the lining applied to the top head or arch portion of the vessel at the point where it joins the lining covering the side portions of the vessel;

Fig. 6 is a fragmentary view in elevation showing a portion of the shingle covering applied to the underside of the top head of the vessel;

Fig. 7 is an enlarged fragmentary sectional view showing the construction of the lined vessel in the area of the top head as taken along the line 7—7 of the Fig. 6;

Fig. 8 is an enlarged fragmentary sectional view showing the joint between adjacent refractory panels, as taken along the line 8—8 of the Fig. 2;

Fig. 9 is an enlarged fragmentary sectional view showing the joint between adjacent panels as taken along the line 9—9 of Fig. 2;

Fig. 10 is a detail drawing of one of the studs to which steel screen is attached for supporting the lining material; and Fig. 11 is a vertical cross sectional view of a fragment of the opening in the bottom of the lined vessel.

Referring now to the drawings, Fig. 1 shows a vessel, generally indicated by the numeral 12, representing the regenerator of a fluid catalytic cracking system, portions of which have been broken away to more clearly reveal the construction of the thermal insulating and protective internal lining 13, constructed in accordance with the present invention. Such vessels are usually of relatively large dimensions and are fabricated by welding together a series of heavy-gage steel plate segments to form a vessel having a cylindrical body portion and curved end closures, or heads, which may be hemi-spherical, ellipsoidal, conical or of any other shape suitable to provide a gradually converging surface and a strong welded union with the cylindrical body portion of the vessel. The regenerator vessel 12 comprises an upright cylindrical section 14, a top head section 15 and a bottom head section 16, suitably joined along the edges to form a completely enclosed vessel. An inlet nozzle 17 is provided at the apex of the bottom head for connection with a spent catalyst carrier line, and an outlet nozzle 18 is provided at the apex of the top head through which the gaseous products of regeneration may be discharged from the vessel. At the side of the bottom head 16 an outlet nozzle 19 is provided for connection with the usual standpipe, not shown, through which regenerated catalyst may be withdrawn from the vessel for passage to a hydrocarbon feed line leading to a reactor vessel. Extending horizontally across the lower portion of the vessel 12 is a perforated grid 21, which supports the fluidized mass of powdered catalyst, undergoing regeneration. The grid 21 may be supported in any conventional manner, and a ledge 22, projecting inwardly from the wall of the bottom head 16 and extending circumferentially around the inner wall, provided to prevent excessive by-passing of the catalyst-air mixture between the edges of the grid and the vessel walls. Although the lining of the present invention is particularly illustrated in connection with a regenerator vessel, it is to be understood that it is not so limited in its application, but may be employed wherever a refractory lining is required for relatively large vessels or large pipe lines.

Preliminary to the application of the insulating and protective lining, the interior wall surface of the vessel is prepared with suitable means for supporting the various elements of the lining. At suitably spaced horizontal levels within the lower head section 16 and the upright cylindrical section 14, annular metal baffle members are attached to the wall of the vessel to provide vapor stops for preventing the upward passage within the narrow space between the unbonded areas of the inner surface of the vessel 12 and the lining 13 of hydrocarbon vapors which may have penetrated the lining through cracks which may have formed after the lining has been subjected to a drying out procedure. Within the bottom head portion of the vessel, the vapor stops comprise cylindrical rings 23 disposed with their lower edges contacting the inner surface of the bottom head. Circumferential fillet welds may be made along the lower edge of each ring to provide a completely sealed connection between the ring and the head. Along the inner surface of the cylindrical portion 14 of the vessel, the vapor stops consist of flat annular rings 24 welded along their outer circumference to form a sealed connection with the inner surface of the vessel wall. If desired, vapor stops may also be employed along the inner surface of the top head 15, although for most purposes their inclusion is not believed essential.

In Figs. 2 and 3 the construction of the insulation and protective lining applied to the upright cylindrical section 14 is clearly shown in enlarged elevation and section views. In fabricating the lining at the erection site, a plurality of stud members 25 are first attached, as by welding, to the vessel at spaced points along the inner surface of the metal wall 14. Stud members 25 may conveniently consist of special welding studs attached by electric arc welding, and have short reduced portions 26 at the outer or free ends which form narrow shoulders 27, as shown in Fig. 10. Similar stud members 25 are also attached at spaced points along the inner surface of the bottom head 16. For the inner surface of the top head 15, stud members 28 having their outer ends threaded instead of reduced, as on studs 25, are similarly provided. The construction of the lining extending along the inner walls of the cylindrical section 14 and the bottom head section 16 is substantially different from the construction of the lining for the top head because of the less erosive conditions present in the upper portion of the vessel. The stud members 28 attached to the top head are distributed along the surface as shown in Figs. 1, 6 and 7 in order that protective metal shingles later to be described, may be suspended from the studs. Before applying the coating of insulating refractory material, a continuous length of heavy wire 29 is wound around and between the studs 28, covering the entire area of the top head with a lace work of reinforcing wire.

After all the stud members 25 and 28 have been attached to the vessel wall and the wire 29 wound between the studs 28, a layer of insulating refractory material 31 is applied over the entire inner wall surface of the vessel to a depth less than the length of the unreduced portion of studs 25 and the unthreaded portion of studs 28. The wire 29 subsequently becomes completely embedded within the insulating material. The insulating material 31 may be applied in any conventional manner, but a preferred method of application is by what is known as the Guniting procedure in which the ingredients of the coating material are premixed in the proper portions and are then ejected by compressed air from a special gun designed for this purpose. The consistency of the insulating material is such that it readily adheres to the vessel wall without substantial shifting or breaking away from the point of application. The material is continuously sprayed to its full desired depth at each point of application before progressing to the adjacent area. The surface of the insulating material is not trowelled smooth, but is left in an uneven state so that additional refractory material applied later may form a strong interlocking bond with the initial layer of insulating material. After being applied to the entire inner surface of the vessel the insulating material is permitted to set or harden.

A layer of metal shingles 32 is next placed over the inner surface of the upper head. The shingles 32 are provided with a circular opening 33 and a slot 34 near the upper edge to receive the ends of studs 28. The slot is provided in order to allow for lateral expansion or creep of the shingles due to the high temperature conditions within the vessel during operation. The shingles have parallel top and bottom edges, and tapering sides to allow for the convergence of the top head. Around the bottom edge of the upper head 15 the shingles may be square-cut, since the surface of the vessel approaches a cylindrical form. The shingles 32 are arranged in staggered and over-lapping pattern, as clearly shown in Fig. 6. Washers 35 and nuts 36 on the ends of the studs 28 hold the shingles in place. It will be noted that the rows of shingles are arranged to overlap at their upper edges, so that the rising stream of catalyst carried upwardly through the diffuse phase may not easily penetrate under the layers of shingles.

In the cylindrical and bottom head portions of the vessel, washers 37 which are square-cut as a matter of convenience and economy, are placed on the free ends of studs 25 in contact with the shoulder portions 27. The ends of reduced portion 26 project beyond the outer face of the washers 37, and are peened to rigidly attach the washers 37 to the studs 25.

Metal panels of honeycomb mesh 38 are next placed in staggered arrangement about the cylindrical and bottom head portions of the vessel in contact with the outer face portions of the washers 37, and are rigidly attached thereto, as by fillets of deposited weld metal along the junctures of the plates 37 with the edges of the mesh, as shown in Fig. 2. For the middle cylindrical portions of the vessel the panel 38 may be square-cut, but for the lower portion of the vessel it is necessary to taper the sides of the panel to conform with the gradual convergence of the bottom head.

Initially the mesh panels may be fabricated as rectangular units, in which form they may be applied to the side walls of the vessel without preliminary cutting or shaping. For the bottom head, however, it is necessary to gradually reduce the width of the panels and to cut the side edges at an angle, so that the various sections may be fitted together in conformity with the converging surface of the bottom head.

Each panel 38, as initially fabricated, comprises a series of elongated flat metal members alternately deformed outline on the broad faces to provide a continuous series of flat surfaces angularly arranged to form sides of a hexagon. When a series of such members are placed side by side, the flat surfaces of adjacent strips combine to form a series of closed hexagons arranged in a honeycomb pattern. The adjacent strips are suitably joined together in any convenient manner. In fabricating the rectangular panels, two opposite edges of the panel, the upper and lower edges, as shown in the drawings expose the free ends 41 of the flat metal members, and the remaining opposite sides of the panel present the outermost flat side portions 42 of the closed hexagons. The free ends 41 along the upper and lower edges of each panel are provided with aligned openings 43 adjacent the outer edge. A heavy wire 44 of smaller diameter than the diameter of the openings 43 is passed through the aligned openings. Wires 44 are provided for both the upper and lower edges of the panels and are rigidly attached to the mesh as by a series of tack-welds. Along the vertical sides of the panels a series of lugs 45 are attached, as by welding, to selected flat portions 42 of the mesh. Lugs 45 have openings 46, the openings along each side of the panel being in alignment. Lugs 45 may conveniently be provided by using standard square nuts and joining one face by deposited weld metal to the flat side 42. A rod or wire 47 is passed through the aligned openings 46 on each side of the panel and is rigidly secured to the panel, as by a series of tack-welds. The rod 47 has a diameter less than that of the nut opening 46. Lugs 45 ordinarily are not required to be attached to all of the sides 42 along the panel, it being necessary to provide merely enough to give the necessary structural stability to the rod or wire 47.

For the converging wall of the lower head the side edges of the panels 38 are required to be cut on a bias to allow for convergence toward the center of the head, in the manner required for the metal shingles placed on the upper head. In cutting the sides of rectangular mesh panels 38 to provide the necessary taper, the normally uniform pattern of closed hexagons along the vertical sides of the panel is destroyed, so that the side edges of the panels will consist of a combination of closed hexagons and exposed cut edges of the metal members. In order to attach rods 47 to the tapered sides of the panels, it is convenient to employ a combination of openings formed in the free cut ends of the mesh and lugs 45 attached where necessary or practicable. The openings in the cut ends of the mesh and the openings in the lugs are aligned to receive rods 47.

In placing the mesh panels 38 along the side walls and bottom head of the vessel thay are arranged in a staggered brickwork pattern, leaving gaps 48 between adjacent panels. After the panels have been suitably attached to the studs, a wooden frame is constructed about each of the panels. The wooden frame consists of a plurality of flat wooden slats 49 placed in the gaps 48 and positioned substantially midway between panels 38. The wooden frame may be held in its desired position by any suitable means, as by tack-welding the head of a nail to the side surface of the mesh and impaling the slat on the projecting point of the nail, or by tying the slats in position. The outer edges of the wooden frames are used to determine the desired depth of the final refractory coating that is to be applied over the insulating refractory material 31. Preferably, the outer edge of the wooden frame is approximately the same distance from the metal wall of the vessel as the outer surface of the mesh panel 38. Along the upper edge of the paneled area, that is, where it adjoins the shingled area of the vessel, the mesh panels 38 overlap the bottom edge of the lowermost row of shingles. Preferably, the mesh panels 38 are spaced slightly outward from the shingles. The wooden slats 49 forming the upper border of the paneled area are placed with their inner edges in contact with the shingles 32 so that, when the final coat of the refractory material is applied, a well defined edge may be provided along the upper border of the refractory material.

After the mesh panels 38 are secured in place, and before the final coating of refractory material 51 is applied, the reinforcing framework for the ledge 22 is constructed. A series of metal angle members 52 of round bar stock are atached, as by welding, to the mesh panels 38. The series of angle members 52 are relatively closely spaced and extend about the entire circumference of the vessel. A covering of wire mesh 53 is then placed over the outer surface of the ledge defined by the members 52 and is secured thereto, as with lengths of heavy-gauge wire 54 encircling the members 52 and twisted about the adjacent portions of the mesh. The wire mesh 53, is applied in sections, and a spacer 58, which may be a sheet of tar paper, is placed radially between adjacent sections to provide expansion gaps in the final coating.

After the paneled area of the vessel has been suitably framed, the final coating of refractory castable material 51 is applied, preferably by guniting, over the entire paneled area, through the interstices of the mesh panel. The refractory material 51 adheres to the rough outer surface of the insulating refractory material 31, previosuly applied, and the coating is built up until it completely covers the mesh panels 38 and the wire mesh 53 covering the ledge 22. The outer surface of the refractory lining 51 is made as smooth as possible so that the abrasive effect caused by the impingement of the catalyst particles on the outer surface of the lining may be minimized.

By installing mesh panels in the above-described manner, it is possible to minimize the delays occasioned by the necessity for trimming and fitting the panels whenever unavoidable irregularities are encountered in fabricating and assembling the metal walls of the vessel. The provision of substantial gaps 48 between adjacent mesh panels 38, makes it possible to shop-fabricate the mesh panels according to design specifications, and to subsequently attach the panels at the construction site by varying the gaps 48 between panels 38 to compensate for any irregularities in the vessel as actually constructed. It is contemplated that the gaps between panels 38 may vary between about one half inch and a few inches. If desired, the wooden slats 49 may be placed in such manner as to compensate for irregular placement of the mesh panels, so that, when the final coating of refractory material 51 is applied to cover the mesh panels, the contour of the vessel lining will be determined by the wooden slats. Along the upper border of the paneled area, the refractory material 51 overlaps and seals the lower edges of the shingled area.

The wooden framework which has become embedded in the refractory material 51 and the spacers 58 in the ledge 22 are not required to be removed after the refractory material has become permanently set. As soon as the regenerator vessel is placed in operation, the extremely high temperature within the vessel immediately causes the wooden framework and the combustible spacers to burn away, thus leaving a staggered pattern of grooves to outline the location of the mesh panels 38 covered by the refractory lining 51, and a series of gaps along the ledge to allow for expansion. The grooves in the face of the lining may serve the useful function of guiding repair men, should it subsequently be necessary to chip out damaged portions of the lining and to replace damaged mesh panels.

In the vicinity of the various nozzles, such as the spent catalyst inlet at the apex of the bottom head, the outlet for regenerated gases at the apex of the top head, and the nozzles for the standpipe, circular openings are provided in the metal panels 38, or in the shingles 32. Referring to Fig. 11, the spent catalyst inlet nozzle 17 extends into the vessel beyond the outer surface of the mesh panel 38. Nozzle 17 is provided with a jacket 55 joined, as by welding, at its inner end to the wall of the bottom head portion 16 and tapering inwardly at its outer end to join the outer wall of the nozzle. A space 56 is thus provided around the neck of the nozzle 17 to receive the insulating refractory material 31. A flange ring 57 is attached to the inner end of the nozzle 17, overlapping the edges of the opening in the mesh panel 38.

Although I have shown certain specific embodiments of the invention for the purposes of illustration, it will be apparent to those skilled in the art that various changes and modifications may be made without departing from the spirit of the invention. For example, the preferred metal for this vessel shell, studs, and mesh structure, is steel, but other metals might conceivably be used. The preferred method to achieve a unitary structure of greater strength with the greatest ease of construction is by the welding of the component metal parts, but other means of attachment might conceivably be employed. The mesh structure referred to, is most conveniently attached as a plurality of panels, but it is conceivable that some other form of reinforcing structure might be employed. It is desired, therefore, that only such limitations be placed on the invention as is set forth in the appended claims.

I claim:

1. A vessel adapted to contain therein a mass of hot powdered solids at temperatures between 600° F. and 1500° F., through which a fluidizing gas is adapted to be passed at sufficient velocity to maintain said solids in a fluidized condition in a lower dense phase and an upper dilute phase separated by an interface region, said vessel comprising a wall defining metal shell, a plurality of metal stud members spaced apart over substantially the whole inner surface of said shell, said stud members welded to the inner surface of said shell and projecting inwardly thereof, a metal grid structure formed of a plurality of separate panels welded to the extending ends of said studs, an insulating refractory lining covering the surface of said metal shell and enveloping said metal stud members and said metal grid structure, said lining including a monolithic layer of insulating refractory concrete adjacent the inner surface of said metal shell containing a substantial portion of light weight, porous, refractory aggregate, said monolithic layer having a density of less than 75 pounds per cubic foot, a second layer covering said monolithic layer, said second layer composed of abrasion resistant refractory concrete containing a substantial portion of hard dense refractory aggregate, said abrasion resistant concrete having a density greater than 100 pounds per cubic foot, said abrasion resistant layer of concrete deposited on the inner surface of said monolithic layer and extending inwardly for the full thickness of said grid structure to be reinforced thereby, said abrasion resistant layer formed as a plurality of separate panels each substantially coextensive with a respective panel of said metal grid structure, and inlet and outlet means opening into the interior of said vessel adapted for entrance and removal of said solids and gas.

2. A vessel adapted to contain therein a mass of hot powdered solids at temperatures between 600° F. and 1500° F., through which a fluidizing gas is adapted to be passed at a sufficient velocity to maintain said solids in a fluidized condition in a lower dense phase and an upper dilute phase separated by an interface region, said vessel comprising a wall defining metal shell, a plurality of metal stud members spaced apart over substantially the whole inner surface of said shell, said stud members welded to the inner surface of said shell and projecting inwardly thereof, a metal grid structure formed of a plurality of separate panels welded to the extending ends of said studs, said grid structure covering the inner surface of said vessel from the bottom thereof to a level adjacent the upper end thereof coinciding with the normal location of said interface region in the use of said vessel, a plurality of steel plates arranged in overlapping shingle arrangement attached to said studs above said level adjacent the upper end of said vessel to cover the entire inner surface of said vessel above said level, an insulating refractory lining covering substantially the whole inner surface of said metal shell and enveloping said metal stud members and said metal grid structure, said lining extending at the upper end thereof to said steel plates, said lining including a monolithic layer of insulating refractory concrete adjacent the inner surface of said metal shell containing a substantial portion of light weight, porous, refractory aggregate, said monolithic layer having a density of less than 75 pounds per cubic foot, a second layer covering said monolithic layer substantially from said level adjacent the upper end of said vessel to the bottom of said vessel, said second layer composed of abrasion resistant refractory concrete containing a substantially portion of hard dense refractory aggregate, said abrasion resistant concrete having a density greater than 100 pounds per cubic foot, said abrasion resistant layer of concrete deposited on the inner surface of said monolithic layer and extending inwardly for the full thickness of said grid structure to be reinforced thereby, said abrasion resistant layer formed as a plurality of separate panels each substantially coextensive with a respective panel of said metal grid structure, and inlet and outlet means opening into the interior of said vessel adapted for entrance and removal of said solids and gas.

References Cited in the file of this patent

UNITED STATES PATENTS

| | | |
|---|---|---|
| 1,982,110 | Keown | Nov. 27, 1934 |
| 1,993,500 | Benner | Mar. 5, 1935 |
| 2,020,630 | Anderson | Nov. 12, 1935 |
| 2,028,968 | Carlstrom | Jan. 28, 1936 |
| 2,296,392 | Marchant | Sept. 22, 1942 |
| 2,382,474 | Gambo | Aug. 14, 1945 |
| 2,416,490 | Molique | Feb. 25, 1947 |
| 2,429,949 | Thayer | Oct. 28, 1947 |
| 2,525,821 | Molique | Oct. 17, 1950 |
| 2,536,039 | Craven | Jan. 2, 1951 |
| 2,716,054 | Bergstrom | Aug. 23, 1955 |